US012330322B2

(12) United States Patent
Al-Ansari

(10) Patent No.: US 12,330,322 B2
(45) Date of Patent: Jun. 17, 2025

(54) ADJUSTABLE-TAPER HAIR CLIPPER COMB ATTACHMENT

(71) Applicant: Abdulaziz Esmaeel Al-Ansari, Doha (QA)

(72) Inventor: Abdulaziz Esmaeel Al-Ansari, Doha (QA)

(73) Assignee: Abdulaziz Esmaeel Al-Ansari, Doha (QA)

( * ) Notice: Subject to any disclaimer, the term of this patent is extended or adjusted under 35 U.S.C. 154(b) by 409 days.

(21) Appl. No.: 17/691,687

(22) Filed: Mar. 10, 2022

(65) Prior Publication Data

US 2023/0286181 A1 Sep. 14, 2023

(51) Int. Cl.
*B26B 19/20* (2006.01)
*B26B 19/38* (2006.01)

(52) U.S. Cl.
CPC .......... *B26B 19/20* (2013.01); *B26B 19/3813* (2013.01)

(58) Field of Classification Search
CPC ..... B26B 19/20; B26B 19/38; B26B 19/3813; B26B 21/4037; B26B 21/42; A45D 24/36
USPC ....................................... 30/233.5; 132/213.1
See application file for complete search history.

(56) References Cited

U.S. PATENT DOCUMENTS 2,188,131 A * 1/1940 Bois ...................... B26B 21/125 30/30
2,381,046 A * 8/1945 Giorgi ..................... B26B 19/20 30/34.05
2,731,720 A * 1/1956 Henard ................... B26B 19/20 30/201
2,802,263 A * 8/1957 Marchner ............... B26B 19/20 30/201
2,916,820 A * 12/1959 Clark ...................... B26B 19/20 30/201
3,030,707 A * 4/1962 Garvey ............... B26B 19/3813 30/537
3,295,201 A * 1/1967 Pucino .................... B26B 19/20 30/200
3,295,202 A * 1/1967 Pucino .................... B26B 19/20 30/200
3,392,444 A * 7/1968 Olson ................. B26B 19/3813 30/233.5
3,638,665 A * 2/1972 Staffas, Sr. ............ A45D 24/36 132/129
3,648,370 A * 3/1972 Cercone .................. B26B 19/20 30/201
3,969,819 A * 7/1976 Pepera .................... B26B 19/20 30/200

(Continued)

FOREIGN PATENT DOCUMENTS

EP 2322328 A1 5/2011
JP H0984626 A * 3/1990 ............. A46D 24/36

(Continued)

OTHER PUBLICATIONS

Extended European Search Report for related European Application No. 22194831.8; action dated May 15, 2023; (6 pages).

*Primary Examiner* — Adam J Eiseman
*Assistant Examiner* — Fernando A Ayala
(74) *Attorney, Agent, or Firm* — K&L Gates LLP

(57) ABSTRACT

A comb attachment for use with a hair clipper is provided. The comb attachment includes a comb blade section and a base section configured to be removably attached to a hair clipper. The base section is configured to adjust a taper angle of the comb blade section and adjust a length of the comb attachment.

11 Claims, 18 Drawing Sheets

(56) References Cited

U.S. PATENT DOCUMENTS

| | | | | |
|---|---|---|---|---|
| 4,888,870 | A * | 12/1989 | Fujikawa | B26B 19/20 30/200 |
| 5,084,974 | A * | 2/1992 | Sukow | B26B 19/20 30/233 |
| 6,079,103 | A * | 6/2000 | Melton | B26B 19/20 30/79 |
| 6,243,955 | B1 * | 6/2001 | Forbers | B26B 19/20 30/208 |
| 6,968,623 | B2 * | 11/2005 | Braun | B26B 19/20 30/201 |
| 7,234,472 | B2 * | 6/2007 | Ramet | A45D 24/02 132/270 |
| 10,307,920 | B1 * | 6/2019 | Sanchez | B26B 19/20 |
| 11,364,647 | B2 * | 6/2022 | Eijkelkamp | B26B 19/102 |
| 11,738,474 | B2 * | 8/2023 | Van Veldhuizen | B26B 19/20 30/201 |
| 11,919,181 | B2 * | 3/2024 | Van Veldhuizen | B26B 19/3813 |
| 2008/0289192 | A1 * | 11/2008 | Martelli | B26B 19/20 132/200 |
| 2012/0233865 | A1 * | 9/2012 | Kammer | B26B 19/3846 30/201 |
| 2016/0199988 | A1 * | 7/2016 | Altomare | B26B 19/3873 83/13 |
| 2017/0305020 | A1 * | 10/2017 | Darwinkel | B26B 19/20 |
| 2020/0031003 | A1 * | 1/2020 | Brown | B26B 19/3886 |
| 2020/0230832 | A1 * | 7/2020 | Danmola | B26B 19/3813 |
| 2021/0347075 | A1 * | 11/2021 | Van Veldhuizen | B26B 19/20 |
| 2022/0024060 | A1 * | 1/2022 | Van Veldhuizen | B26B 19/3813 |
| 2022/0072723 | A1 * | 3/2022 | Toy | B26B 19/20 |
| 2024/0066730 | A1 * | 2/2024 | Al-Ansari | B26B 19/3813 |

FOREIGN PATENT DOCUMENTS

| | | | | |
|---|---|---|---|---|
| JP | H10263218 A | * | 10/1998 | B26B 19/20 |
| JP | 3144864 U | * | 9/2008 | A45D 24/00 |
| KR | 101694953 | * | 3/2016 | A45D 24/14 |

* cited by examiner

ADJUSTABLE-TAPER HAIR CLIPPER COMB ATTACHMENT

BACKGROUND

A comb attachment may be used with a hair clipper. The comb attachment may help the user of the hair clipper to trim the hair of the subject in a uniform length. For example, the comb attachment may help the user of the hair clipper to keep a predetermined distance between the blade of the hair clipper and the scalp of the subject.

There could be various types of comb attachments. Conventional hair clipper comb attachments are normally in a rigid form. Fixed/rigid comb attachments may also have a predefined taper or slope that allows a hair clipper to cut hair at a uniformly increasing length. However, such attachments are available in a rigid form, where the direction of the taper and the length are fixed. In some conventional comb attachments, the length may be adjustable, but they allow only to increase or decrease the length to several predetermined length values with no other freedom in motion.

SUMMARY

The present disclosure provides an adjustable-taper hair clipper comb attachment. In an example, the comb attachment may include a comb blade section and a base section configured to be removably attached to a hair clipper. The base section is configured to adjust a taper angle of the comb blade section and adjust a length of the comb attachment.

In some examples of the present disclosure, which may be used in combination with any other example or combination of examples listed herein, the comb blade section may include a plurality of fins.

In some examples of the present disclosure, which may be used in combination with any other example or combination of examples listed herein, the base section may include one or more guiding sliders and one or more motion transfer arms attached to the one or more guiding sliders.

In some examples of the present disclosure, which may be used in combination with any other example or combination of examples listed herein, the one or more guiding sliders may include a first guiding slider and a second guiding slider.

In some examples of the present disclosure, which may be used in combination with any other example or combination of examples listed herein, the one or more motion transfer arms may include a first motion transfer arm attached to the first guiding slider and a second motion transfer arm attached to the second guiding slider. The comb blade section may be rotated, by a relative movement of the first guiding slider and the second guiding slider, to adjust the taper angle.

In some examples of the present disclosure, which may be used in combination with any other example or combination of examples listed herein, the length of the comb attachment is increased by pushing the comb blade in a distal direction using the first guiding slider and the second guiding slider.

In some examples of the present disclosure, which may be used in combination with any other example or combination of examples listed herein, the length of the comb attachment is decreased by pulling the comb blade section in a proximal direction using the first guiding slider and the second guiding slider.

In some examples of the present disclosure, which may be used in combination with any other example or combination of examples listed herein, the base section may further include a motion-control guiding plate.

In some examples of the present disclosure, which may be used in combination with any other example or combination of examples listed herein, the motion-control guiding plate may be configured to convert the relative movement of the first and second guiding sliders into the rotation of the comb blade section.

In some examples of the present disclosure, which may be used in combination with any other example or combination of examples listed herein, the motion-control guiding plate may be attached to the comb blade section through a fastener.

In some examples of the present disclosure, which may be used in combination with any other example or combination of examples listed herein, a first portion of the first motion transfer arm and a second portion of the second motion transfer arm may be disposed between the motion-control guiding plate and the comb blade section.

In some examples of the present disclosure, which may be used in combination with any other example or combination of examples listed herein, the taper angle may be in a range of about −30° to +30°.

In some examples, a hair-clipping assembly is provided. The hair-clipping assembly may include a hair clipper and a comb attachment for use with the hair clipper. The comb attachment may include a comb blade section and a base section configured to be removably attached to a hair clipper. The base section may be configured to adjust a taper angle of the comb blade section and adjust a length of the comb attachment.

The advantages discussed herein may be found in one, or some, and perhaps not all of the embodiments disclosed herein. Additional features and advantages are described herein, and will be apparent from the following Detailed Description and the figures.

BRIEF DESCRIPTION OF THE DRAWINGS

FIG. 1(*a*) is a perspective view of a schematic diagram of a slider of the example comb attachment of FIG. 11.

DETAILED DESCRIPTION

Figure 1:
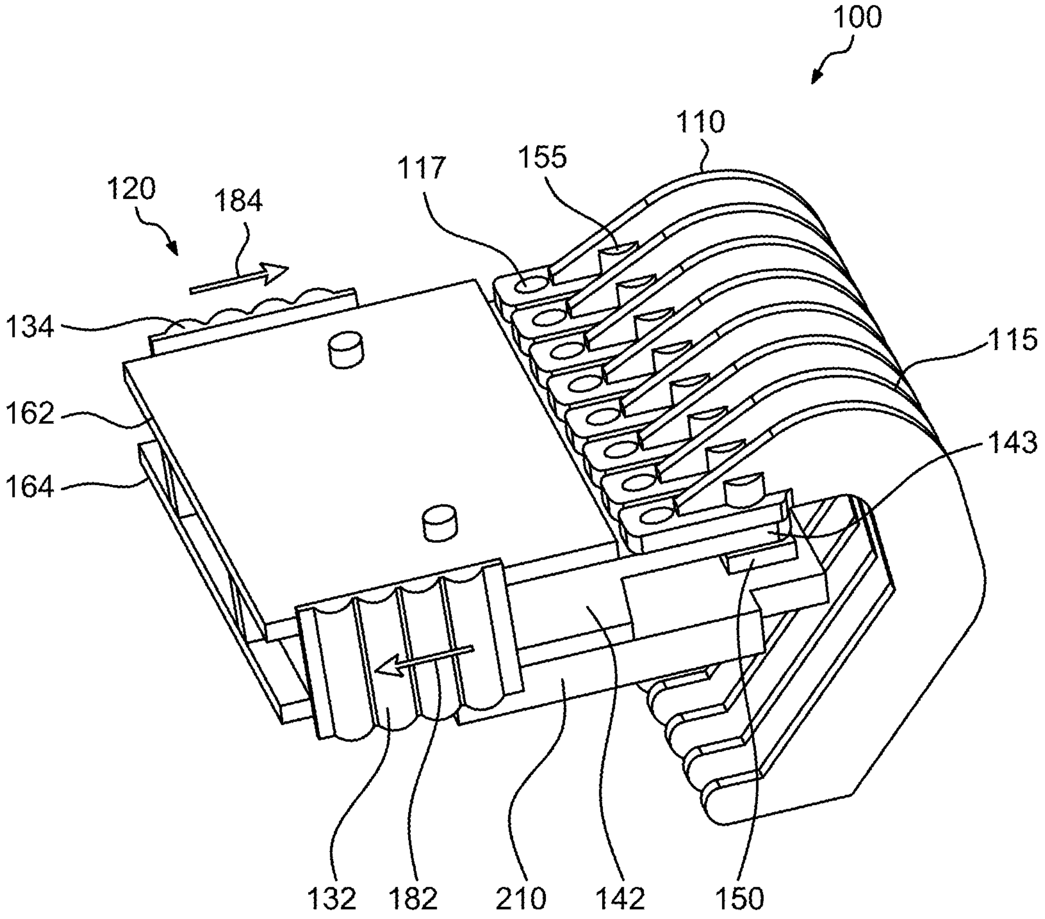
FIG. 1 is a perspective view of a schematic diagram of an example comb attachment according to an example of the present disclosure.
Figure 2:
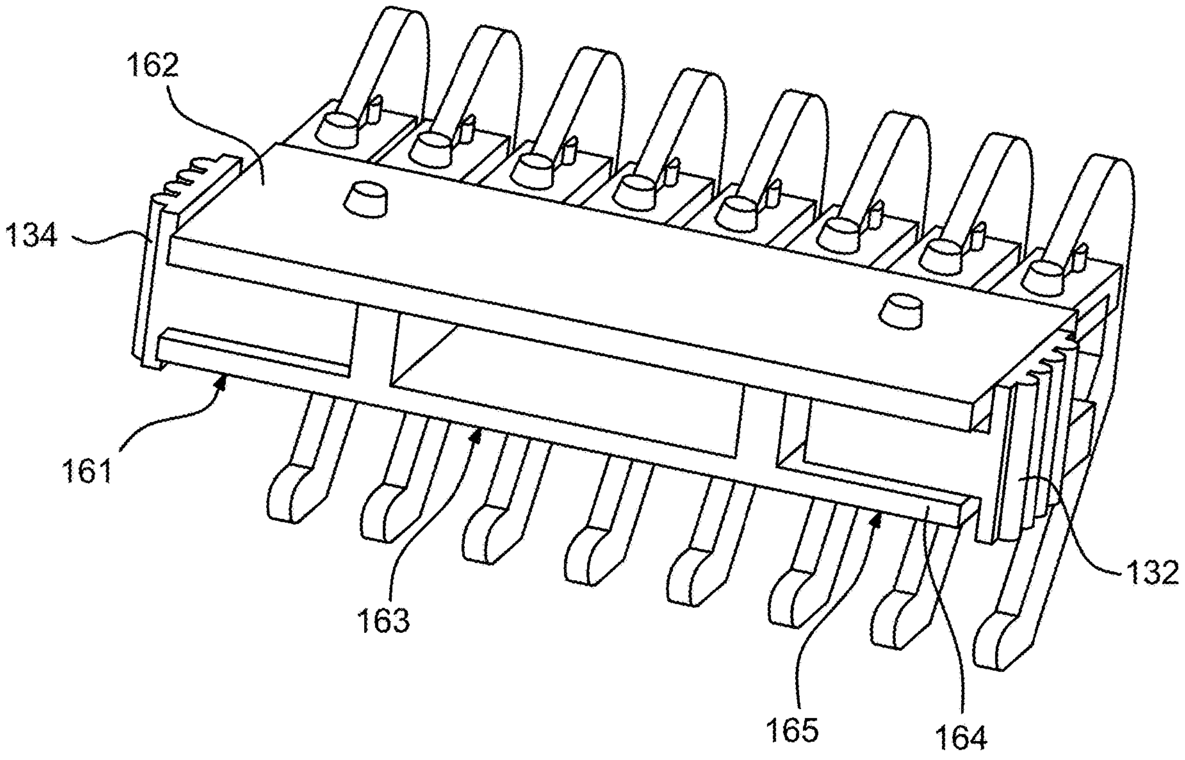
FIG. 2 is another perspective view of a schematic diagram of the example comb attachment of FIG. 1.
Figure 3:
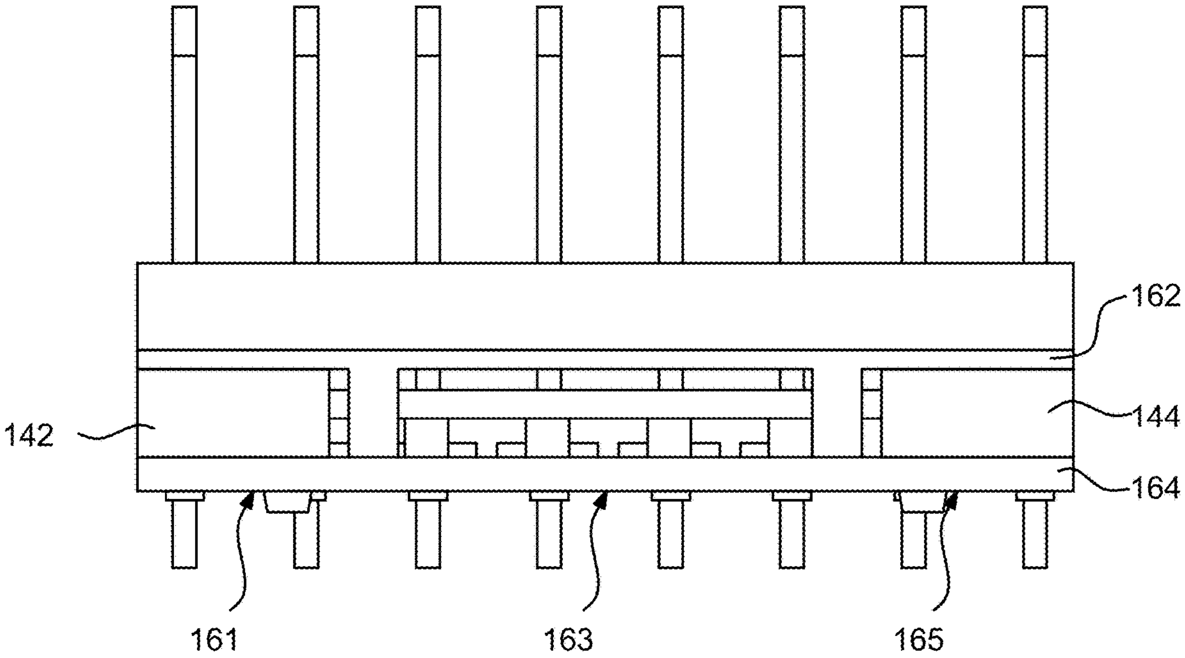
FIG. 3 is a front view of a schematic diagram of the example comb attachment of FIG. 1.
Figure 4:
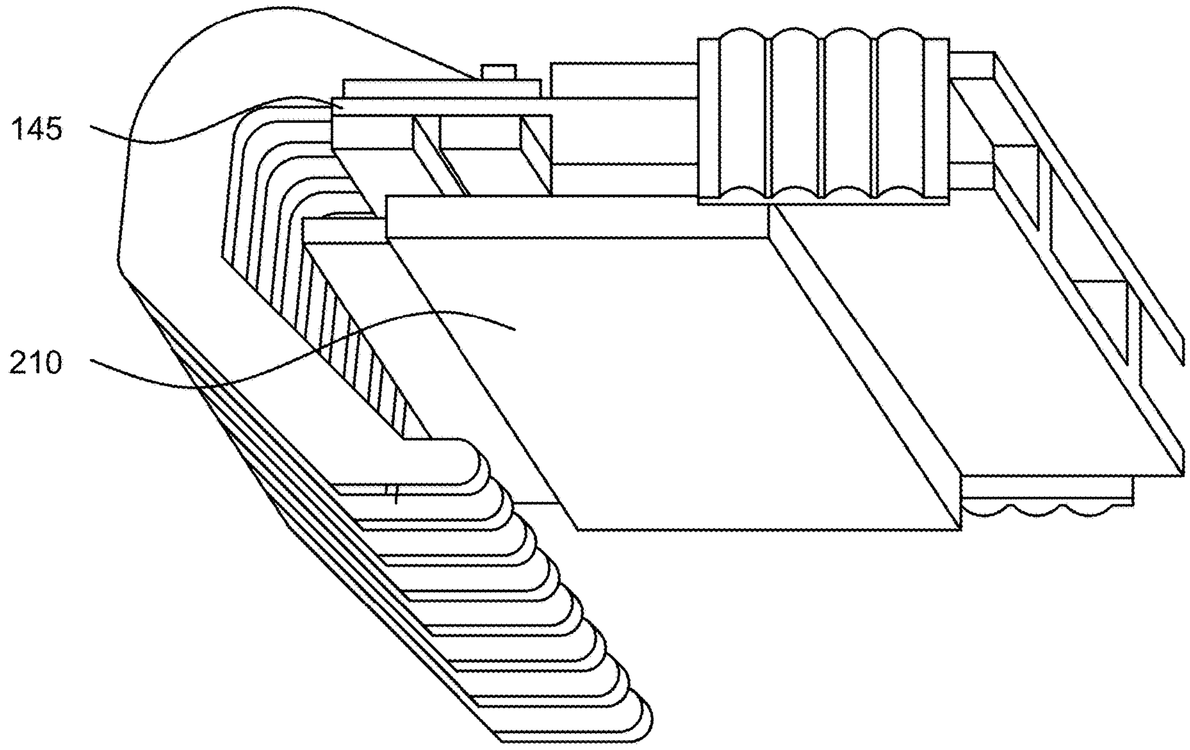
FIG. 4 is another perspective view of a schematic diagram of the example comb attachment of FIG. 1.

Conventional hair clipper comb attachments are normally in a rigid form. Fixed/rigid comb attachments may have a predefined taper or slope that allows a hair clipper to cut hair at a uniformly increasing length. However, such attachments are available in a rigid form, where the direction of the taper and the length are fixed. In some conventional comb attachments, the length may be adjustable, but they allow only to increase or decrease the length to several predetermined length values with no other freedom in motion.

Aspects of the present disclosure may provide a comb attachment that is capable of adjusting the taper direction, taper angle, and the length simultaneously. Referring to FIGS. 1 to 4, in some examples, a comb attachment 100 for use with a hair clipper may be provided. The comb attachment 100 may include a comb blade section 110 and a base section 120. The base section 120 may be removably attached to a hair clipper (e.g., hair clipper 200 in FIG. 5). The base section 120 may be configured to adjust a taper angle of the comb blade section 110 and adjust a length of the comb attachment 100.

In some examples, the comb blade section 110 may include a plurality of fins 115. The comb blade section 110 may further include an edge section 117. The plurality of fins 115 may extend away from the edge section 117 and spaced apart from each other. The fins 115 may help keep a certain distance between the scalp of the subject and the blade of the hair clipper and guide the hair to the blade. In some examples, the fins 115 may be maintained in a vertical position (e.g., parallel to the blade of the hair clipper) all the time.

In some examples, the base section 120 may include a body. The body may include a cover plate 162 and a baseplate 164. The body may include a left portion 161, a center portion 163, and a right portion 165.

In some examples, the base section 120 may include one or more guiding sliders 132, 134. The one or more guiding sliders 132, 134 may include one or more motion transfer arms 142, 144. The one or more guiding sliders may include a first guiding slider 132 and a second guiding slider 134. The one or more motion transfer arms may include a first motion transfer arm 142 of the first guiding slider 132 and a second motion transfer arm 144 of the second guiding slider 134. In some examples, the comb blade section 110 may be rotated, by a relative movement of the first guiding slider 132 and the second guiding slider 134, which may adjust the taper angle of the comb blade section 110. The first guiding slider 132 may be disposed in the right portion 165 of the body of the base section 120. The second guiding slider 134 may be disposed in the left portion 161 of the body of the base section 120.

In some examples, the length of the comb attachment 100 may be increased by pushing the comb blade section 110 in a distal direction 184, for example, using the first guiding slider 132 and the second guiding slider 134. The length of the comb attachment 100 may be decreased by pulling the comb blade section 110 in a proximal direction 182, for example, using the first guiding slider 132 and the second guiding slider 134. The one or more guiding sliders 132, 134 may have a sufficient stiffness so that they maintain their positions once they are set at a desired position (e.g., length, taper direction, and/or taper angle).

In some examples, the base section 120 may further include a motion-control guiding plate 150. In some examples, the motion-control guiding plate 150 may convert the relative movement of the first and second guiding sliders 132, 134 into a rotation motion of the comb blade section 110. In some examples, the motion-control guiding plate 150 may be in a longitudinal plate shape. In other examples, the motion-control guiding plate 150 may be in any other suitable shape (e.g., trapezoid). In some examples, the fins 115 of the comb blade section 110 may be independent from each other and linked together through the motion-control guiding plate 150.

In some examples, the motion-control guiding plate 150 may be attached to the comb blade section 110 through one or more fasteners 155. Examples of the one or more fasteners 155 may include a stud, a bolt, or any other suitable fastener.

In some examples, a first portion 143 (e.g., a distal end portion) of the first motion transfer arm 142 and a second portion 145 (e.g., a distal end portion) of the second motion transfer arm 144 may be disposed between the motion-control guiding plate 150 and the comb blade section 110 (e.g., the edge section 117 of the comb blade section 110).

When the comb attachment 100 is attached to a clipper, a blade 210 of the clipper may be disposed in a space formed by the comb blade section 110 and the base section 120. In some examples, the components of the comb attachment 100 may be made with a plastic material. In other examples, the components of the comb attachment 100 may be made with any other suitable material (e.g., steel, wood).

Figure 5:
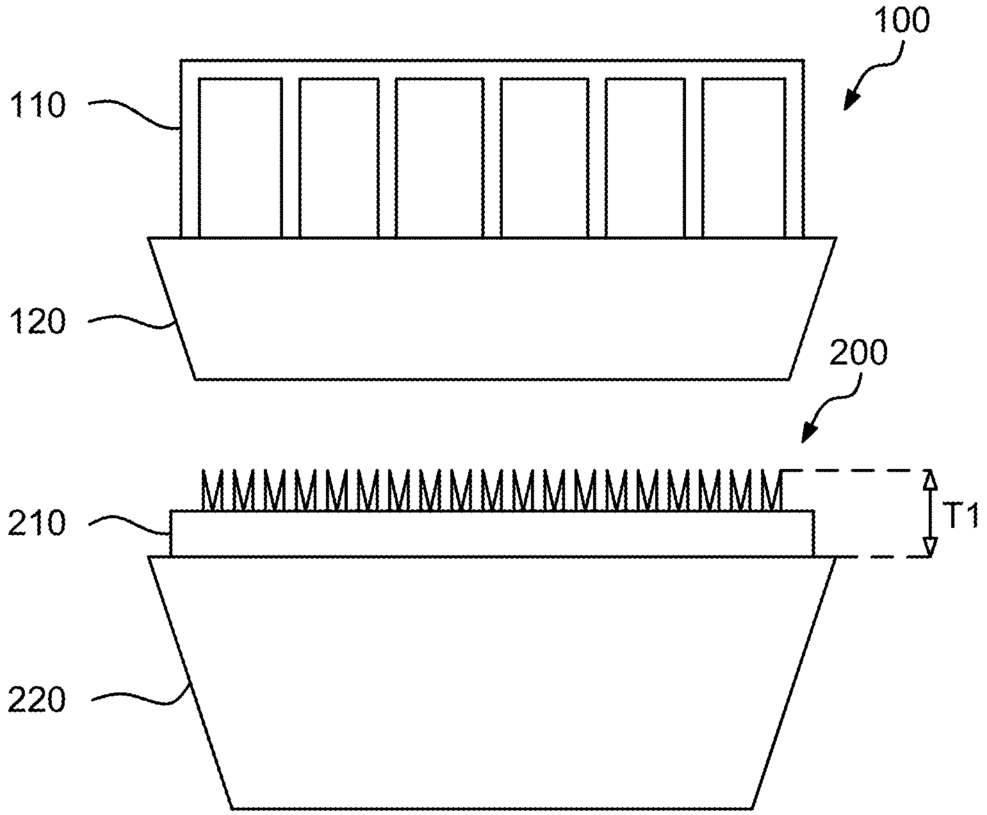
FIG. 5 is a top view of a schematic diagram of the example comb attachment of FIG. 1 and an example hair clipper.

FIG. 5 illustrates a schematic diagram of the comb attachment 100 and an example hair clipper 200. The hair clipper 200 may include a blade section 210 configured to trim the hair of a subject, and a body section 220. The blade section 210 may have a first length T1. FIGS. 6 to 9 show a schematic diagram of various example configurations of the comb attachment 100 attached to the hair clipper 200.

Figure 6:
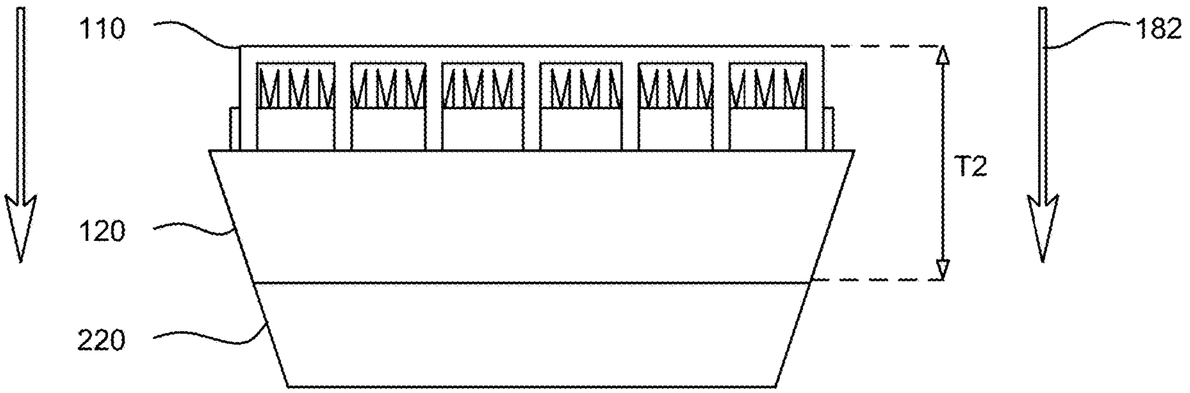
FIG. 6 is a schematic diagram of an example configuration of the example comb attachment of FIG. 5 attached to the example hair clipper of FIG. 5.
Figure 7:
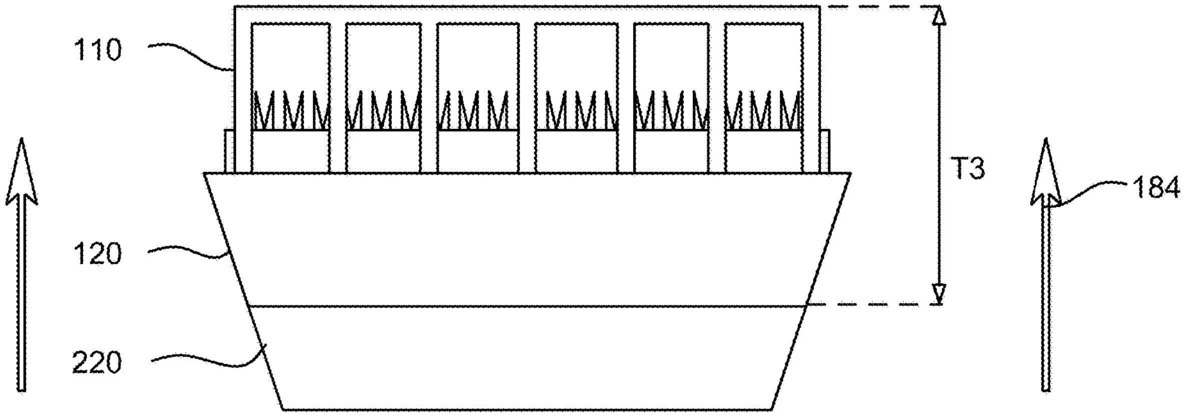
FIG. 7 is a schematic diagram of another example configuration of the example comb attachment of FIG. 5 attached to the example hair clipper of FIG. 5.

As shown in FIGS. 6 and 7, the length of the comb attachment 100 can be adjusted, for example, by the guiding sliders 132, 134. For example, as shown in FIG. 6, when the guiding sliders 132, 134 are pulled all the way back in the proximal direction 182 (i.e., proximal to the user of the hair clipper 200), the comb attachment 100 may have a second (minimum) length T2. The second length may be greater than the first length T1 of the blade section 210 of the hair clipper 200. In this case, the comb blade section 110 may still cover the blade section 210 of the hair clipper 200 so that the blade section 210 stays within the comb attachment 100. The comb blade section 110 may cover the entire width of the blade section 210 of the hair clipper 200 all the time, for example, regardless of the taper angle/slope.

As shown in FIG. 7, when the guiding sliders 132, 134 are pushed all the way forward in the distal direction 184 (i.e., distal from the user of the hair clipper 200), the comb attachment 100 may have a third (maximum) length T3, which is greater than the second length T2. By pushing and/or pulling the guiding sliders 132, 134, the length of the comb attachment 100 can be adjusted to have any length between T2 and T3. In some examples, the second length T2 may be in a range of about 4 cm to about 8 CM. In some examples, the third length T3 may be in a range of about 6.5 cm to about 10.5 cm.

Figure 8:
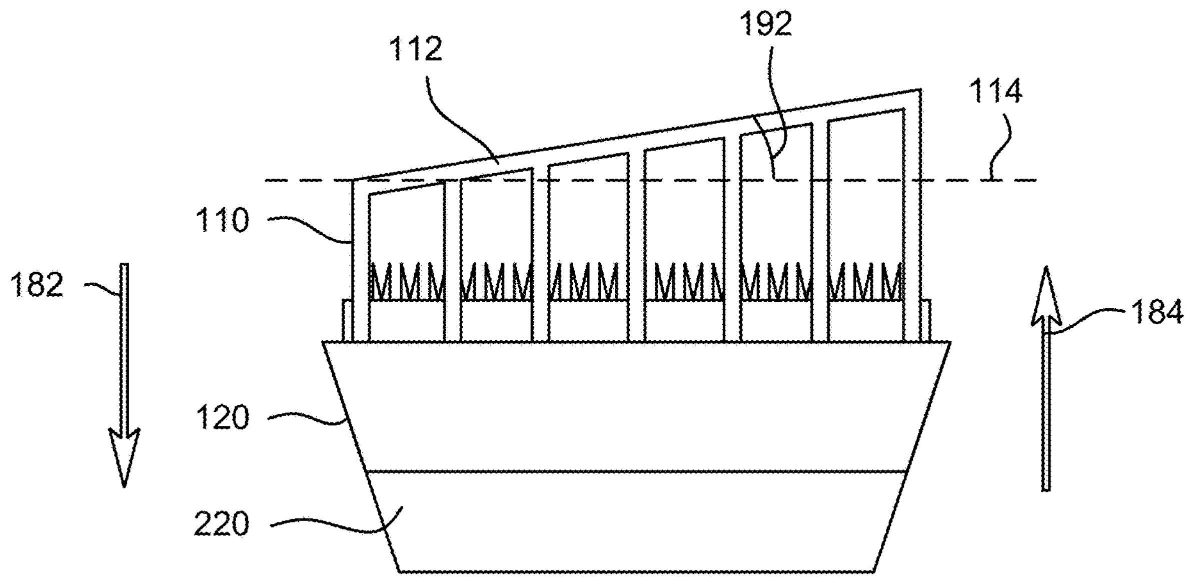
FIG. 8 is a schematic diagram of another example configuration of the example comb attachment of FIG. 5 attached to the example hair clipper of FIG. 5.
Figure 9:
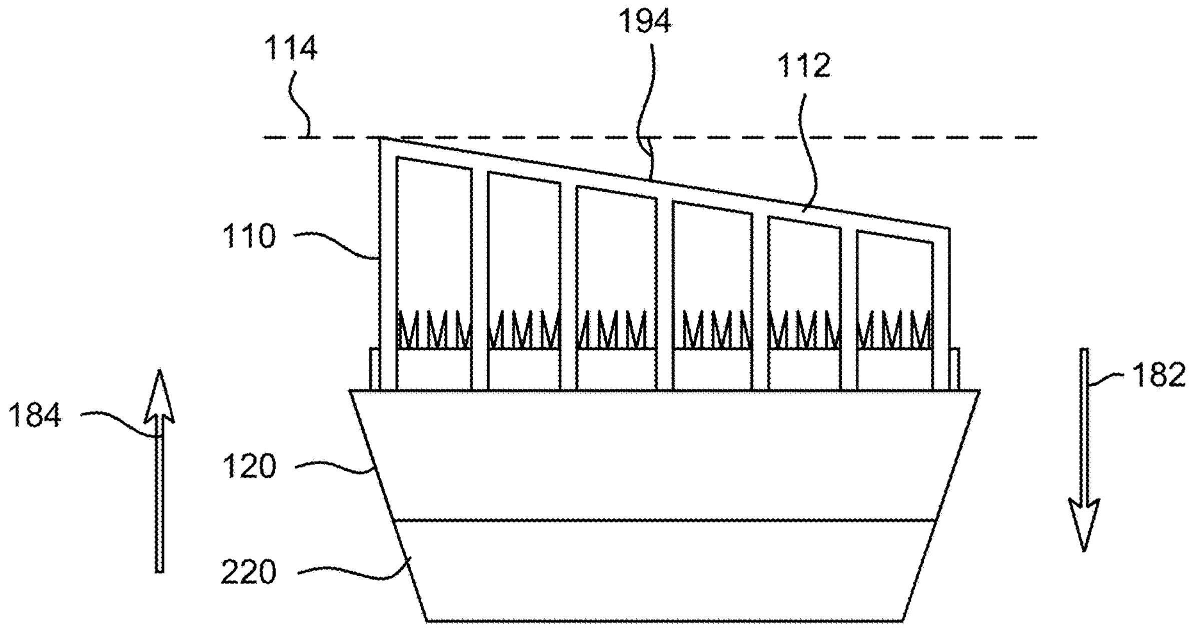
FIG. 9 is a schematic diagram of another example configuration of the example comb attachment of FIG. 5 attached to the example hair clipper of FIG. 5.

In some examples, as shown in FIGS. 8 and 9, the taper direction and taper angle of the comb attachment 100 can be adjusted, for example, by a relative movement of the guiding sliders 132, 134. For example, as shown in FIG. 8, when the first guiding slider 132 is pushed in the distal direction 184 and the second guiding slider 134 is pulled in the proximal direction 182, the comb attachment 100 may have a first taper direction (e.g., right side portion is longer than the left side portion). In this case, the taper angle of the comb attachment 100 may have a first value 192.

As shown in FIG. 9, when the first guiding slider 132 is pulled in the proximal direction 182 and the second guiding slider 134 is pushed in the distal direction 184, the comb attachment 100 may have a second taper direction (e.g., right side portion is shorter than the left side portion). In this case, the taper angle of the comb attachment 100 may have a second value 194.

Figure 10:
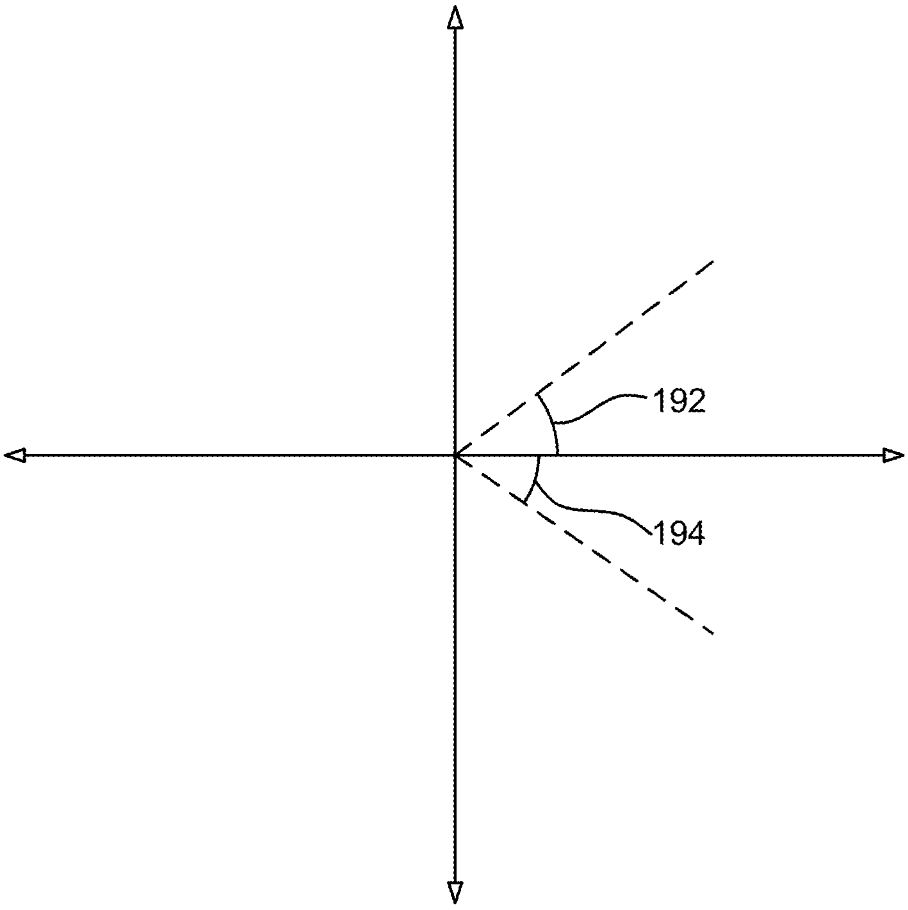
FIG. 10 is a schematic diagram of an example taper angle of the example comb attachment of FIG. 5.

FIG. 10 illustrates a schematic diagram of an example taper angle of the comb attachment 100. In some examples, the first taper angle value 192 may be in a range of about 0° to +30°, and the second taper angle value 194 may be in a range of about −30° to 0°. As used herein, a taper angle may be defined as an angle that is formed between a horizontal line 114 (e.g., a line that is parallel with a width direction of the blade section 210 of the hair clipper 200) and a distal edge 112 of the comb blade section 110. By a relative movement of the first and second guiding sliders 132, 134, the taper angle of the comb attachment 100 can be adjusted to have any angle between −30° and +30°.

Aspects of the present disclosure may enable the comb attachment 100 to adjust the taper direction, the taper angle, and the length simultaneously. For example, by a relative movement of the first and second guiding sliders 132, 134 (e.g., pushing one guiding slider while pulling another guiding slider), a taper direction and a taper angle may be formed, and in a given tapering direction/angle, by pushing or pulling the guiding sliders 132, 134 together in the same direction (and in the same amount), the length of the comb attachment 100 can be adjusted.

In this way, aspects of the present disclosure may provide a single comb attachment that can provide multiple degrees (e.g., at least four) of freedom to adjust a length, a taper direction (left or right), and a taper angle (multiple angles) at the same time. In particular, the comb attachment according to the present disclosure can adjust the starting and ending taper length (e.g., length of the left side and right side). In order to provide the various length, taper direction, and taper angle options that can be provided by the comb attachment according to the present disclosure, at least dozens of or even hundreds of rigid/fixed combs may be needed, which may not be practical and economical. Therefore, the comb attachment according to the present disclosure may be user-friendly and eco-friendly.

Figure 11:
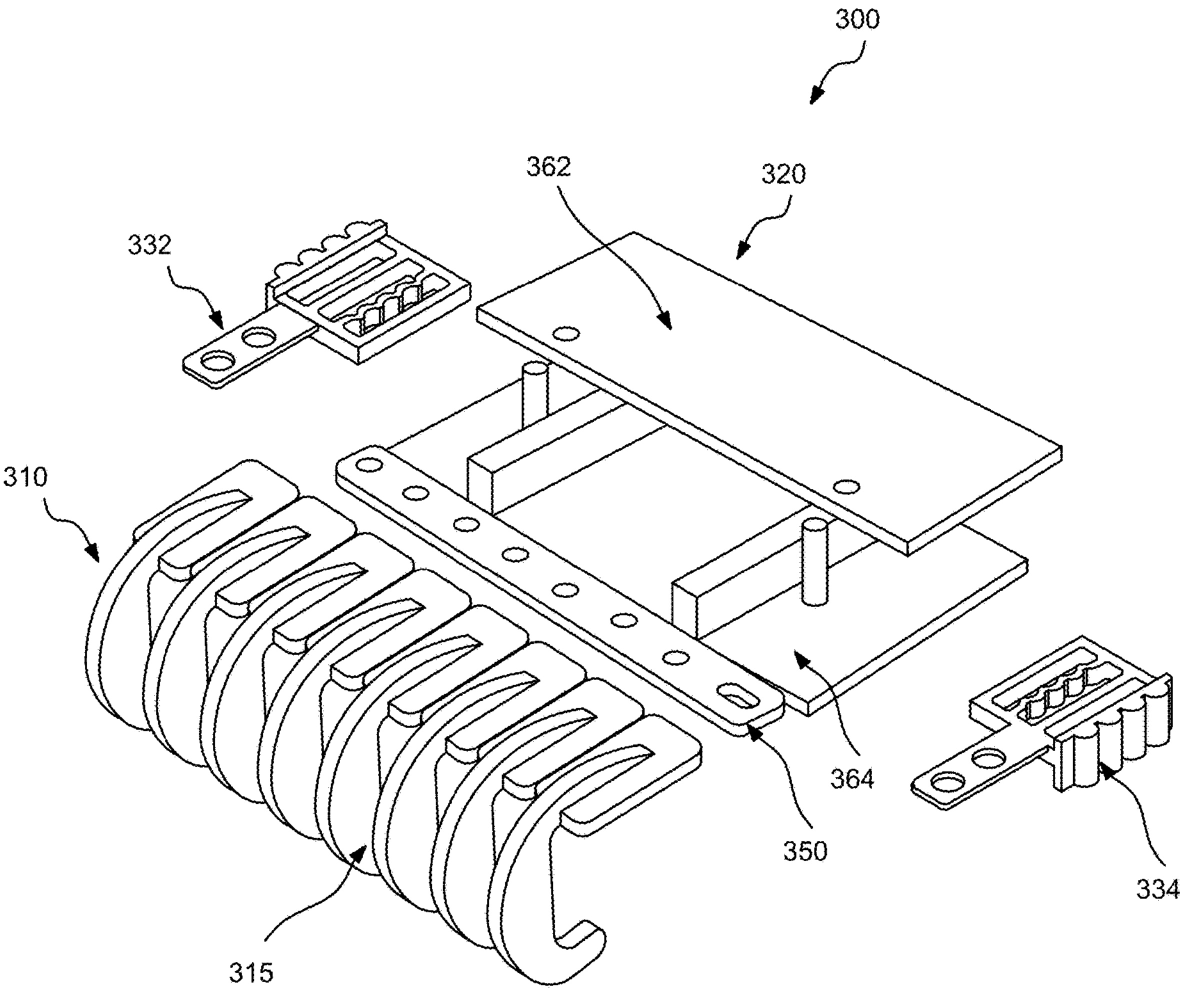
FIG. 11 is a perspective, exploded view of a schematic diagram of another example comb attachment according to an example of the present disclosure.

FIG. 11 illustrates another example comb attachment 300 according to an example of the present disclosure. The comb attachment 300 may include a comb blade section 310 and a base section 320. The base section 320 may be removably attached to a hair clipper (e.g., hair clipper 200 in FIG. 5). The base section 320 may be configured to adjust a taper angle of the comb blade section 310 and adjust a length of the comb attachment 300.

In some examples, the comb blade section 310 may include a plurality of fin sections 315. The fin sections 315 may help keep a certain distance between the scalp of the subject and the blade of the hair clipper and guide the hair to the blade.

Figure 12:
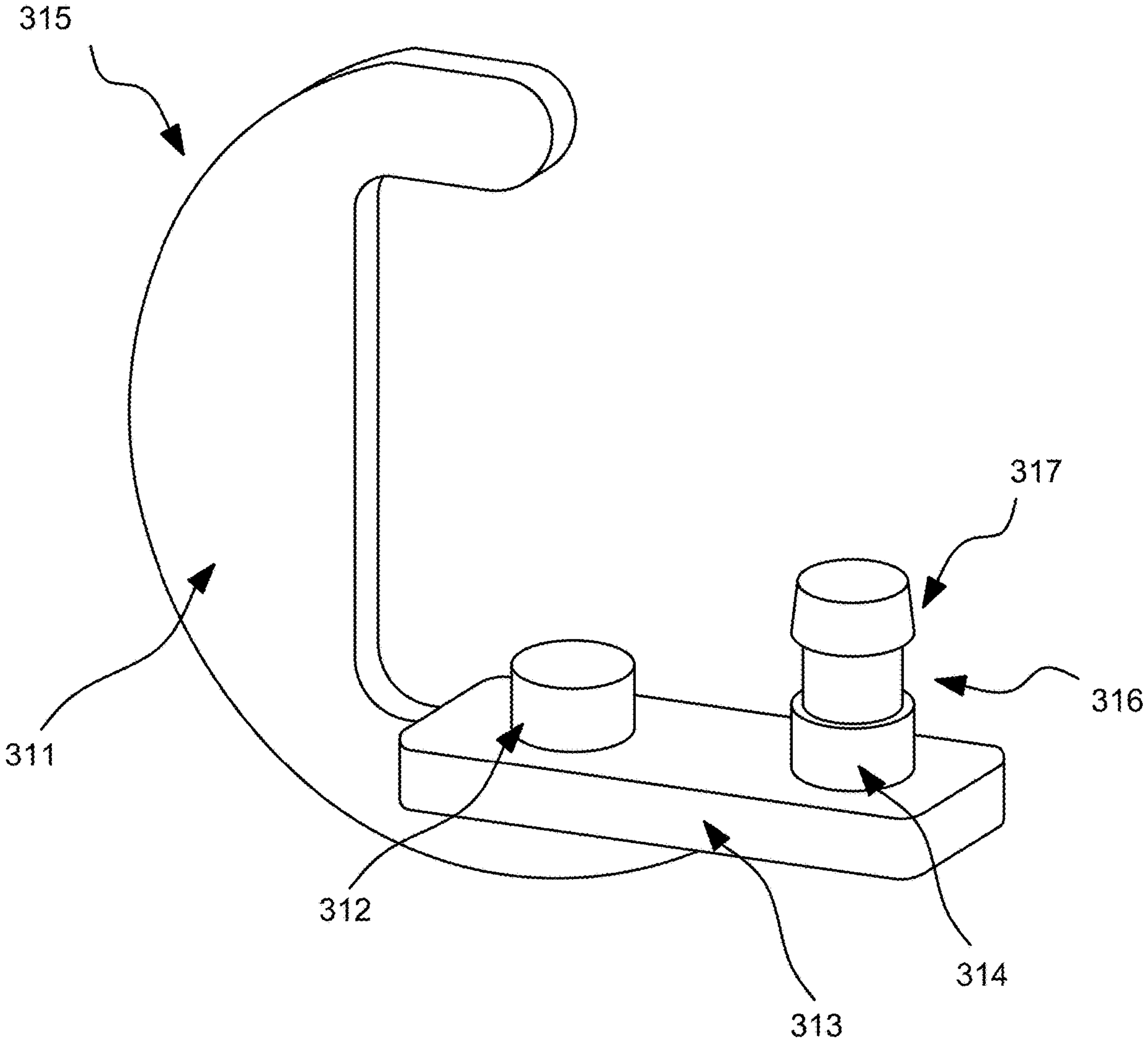
FIG. 12 is a perspective view of a schematic diagram of a fin section of the example comb attachment of FIG. 11.

Referring to FIG. 12, each of the fin sections 315 may include a fin 311, a slider guiding rod (pin joint bearing) 312, a lateral-motion restricting plate 313, a slider guiding rod (pin joint bearing) 314, a guiding plate rod (pin joint bearing) 316, and a locking cap 317. In some examples, the locking cap 317 may be removably attached on the top portion of the guiding plate rod 316. In some examples, the fins 311 may be maintained in a vertical position (e.g., parallel to the blade of the hair clipper) all the time.

Figure 13:
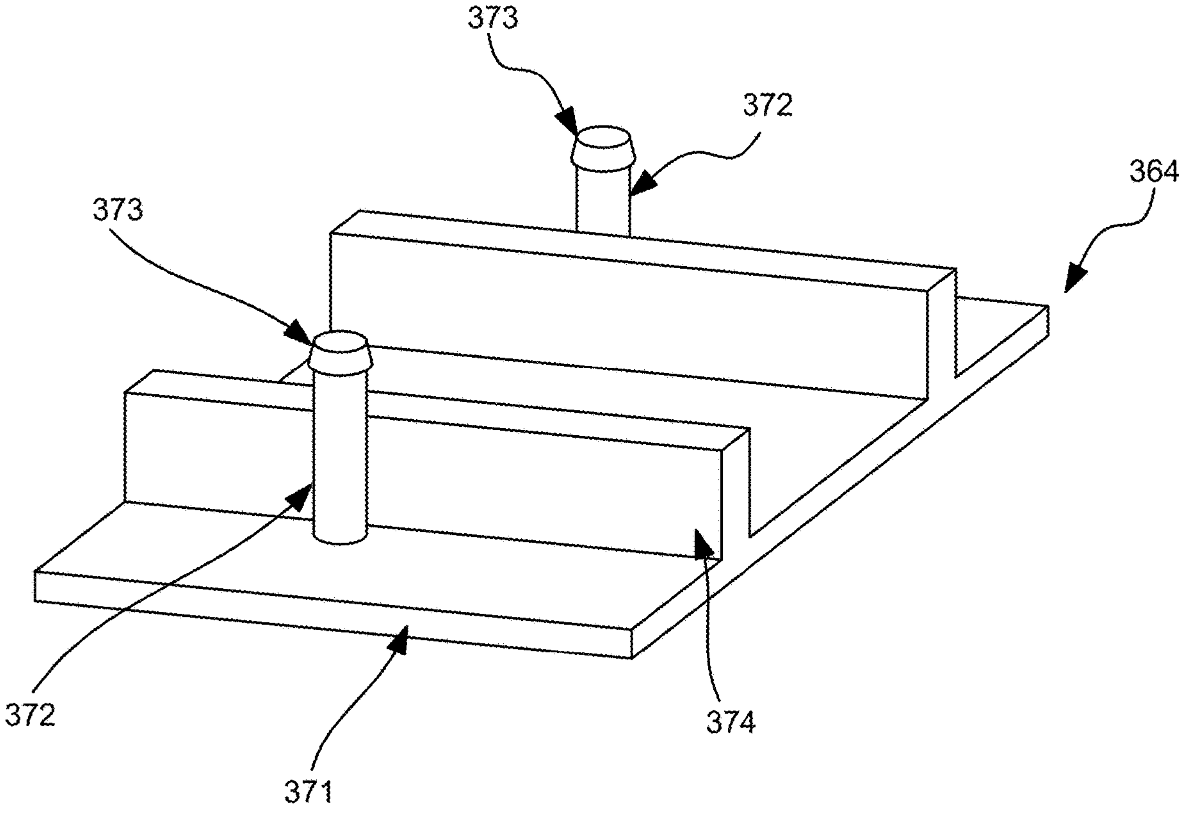
FIG. 13 is a perspective view of a schematic diagram of a baseplate of the example comb attachment of FIG. 11.

In some examples, the base section 320 may include a body. The body may include a cover plate 362 and a baseplate 364. Referring to FIG. 13, the baseplate 364 may include a baseplate outerwall 371, slider mechanism rods 372, a cover plate lock cap 373 on each of the slider mechanism rods 372, and one or more mechanism support/spacer wall 374 disposed between the cover plate 362 and the base plate 364.

Figure 14:
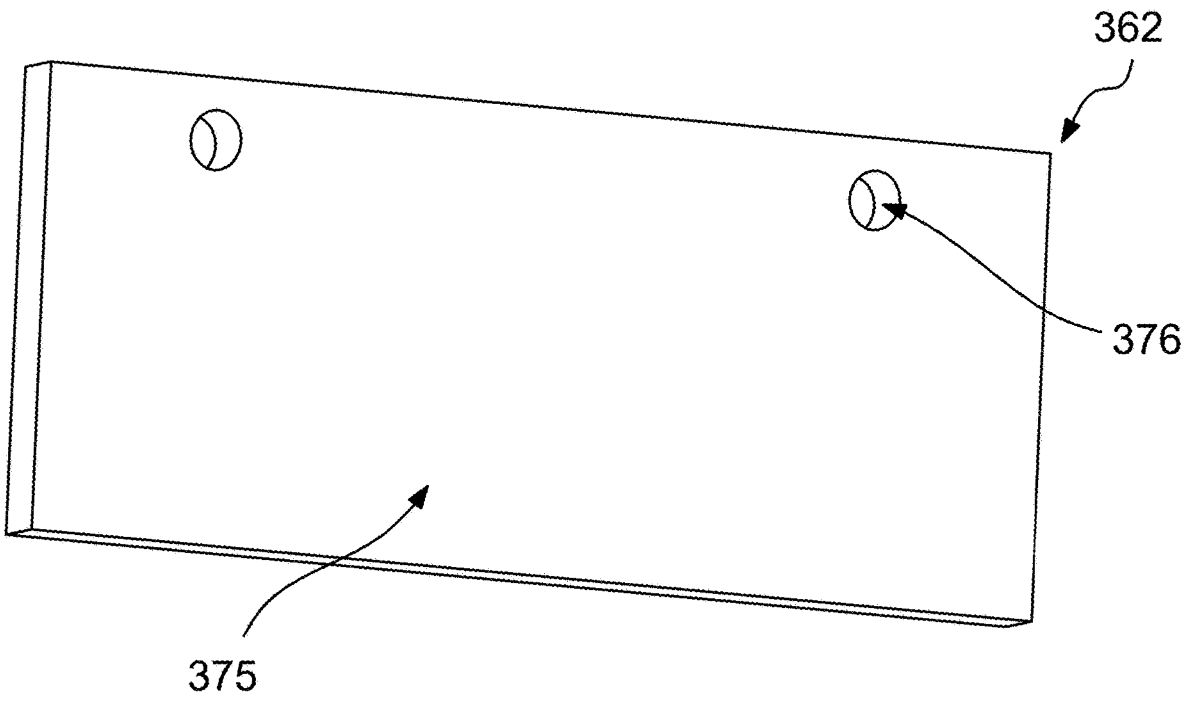
FIG. 14 is a perspective view of a schematic diagram of a cover plate of the example comb attachment of FIG. 11.

Referring to FIG. 14, the cover plate 362 may include a cover plate body 375 and a baseplate lock cap hole 376. The cover plate 362 and the base plate 364 may be coupled to each other through the cover plate lock cap 373 and the baseplate lock cap hole 376. In some examples, the size of the cover plate lock cap 373 may be greater than the size of the baseplate lock cap hole 376. In some examples, the cover plate lock cap 373 can be removably attached to the slider mechanism rod 372 so that, during the assembly of the body, once the top portion of the slider mechanism rod 372 passes though the baseplate lock cap hole 376, the cover plate lock cap 373 may be attached to the top portion of the slider mechanism rod 372 to secure the cove plate 362 to the baseplate 364. In other examples, the cover plate lock cap 373 may be permanently attached to the slider mechanism rod 372. In this case, during the assembly, the cover plate lock cap 373 may be pushed through the baseplate lock cap hole 376.

In some examples, the base section 320 may include one or more guiding sliders 332, 334. The one or more guiding sliders may include a first guiding slider 332 and a second guiding slider 334. In some examples, the comb blade section 310 may be rotated, by a relative movement of the first guiding slider 332 and the second guiding slider 334, which may adjust the taper angle of the comb blade section 310. The first guiding slider 332 may be disposed in the right portion of the body of the base section 320. The second guiding slider 334 may be disposed in the left portion of the body of the base section 320.

Figure 15A:
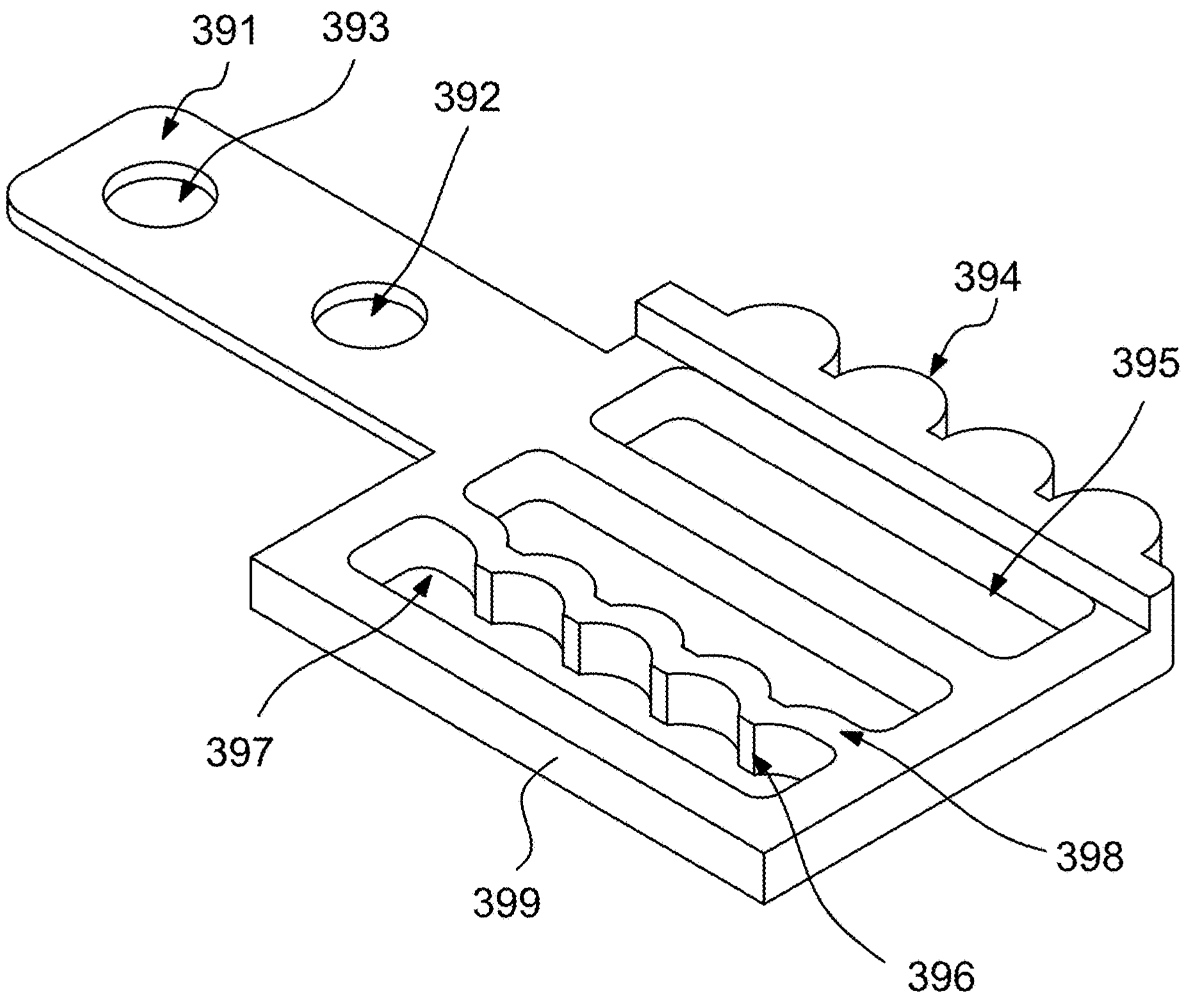
FIG. 15(*b*) is a top view of a schematic diagram of the slider attached to the baseplate of the example comb attachment of FIG. 11.
Figure 15B:
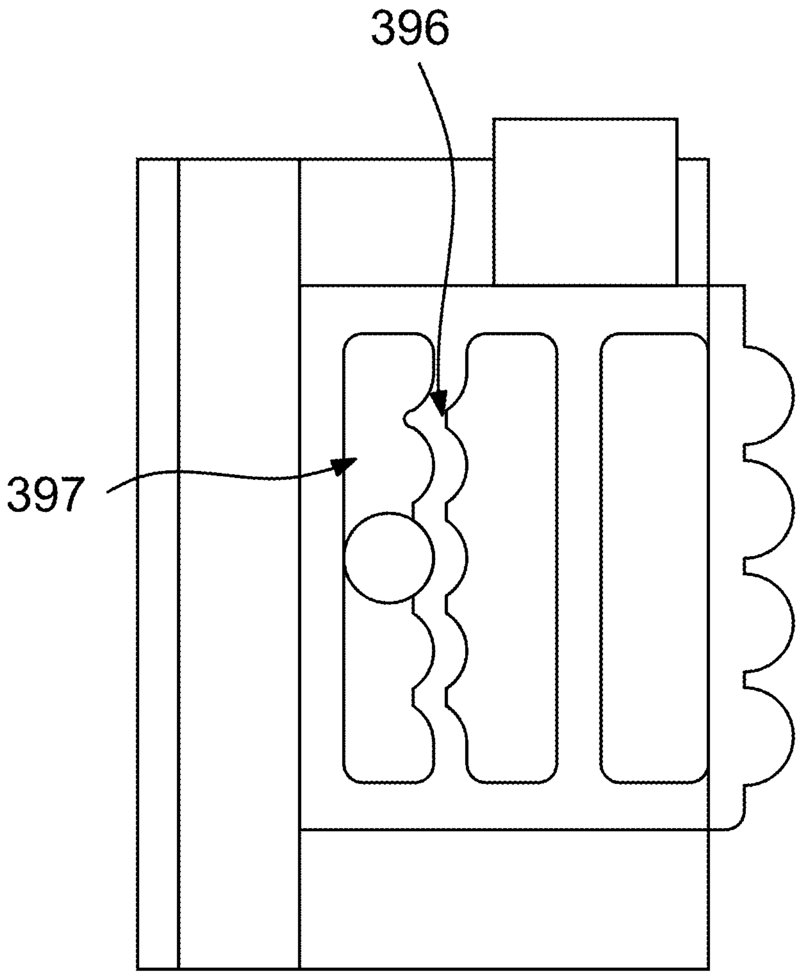

Referring to FIGS. 15(*a*) and 15(*b*), each of the guiding sliders 332, 334 may include a motion transfer guiding arm 391, a fin locking cap hole 392, a fin guiding hole 393, a soft guiding handle 394, a guiding handle pressing gap 395, a plurality of flexible protrusions 396, a groove 397 for the slider mechanism rod 372, a first wall 398, and a second wall 399. The fin locking cap hole 392 may be configured to accept the slider guiding rod 314 and/or the guiding plate rod 316 of one of the fin sections 315 (e.g., the fin section in the left end portion or the right end portion of the blade section 310). The fin guiding hole 393 may be configured to accept the slider guiding rod 312 of one of the fin sections 315 (e.g., the fin section in the left end portion or the right end portion of the blade section 310).

In some examples, a user may move the guiding sliders 332, 334 by pushing/pulling the soft guiding handle 394. In some examples, the length of the comb attachment 300 may be increased by pushing the comb blade section 310 in a distal direction, for example, using the first guiding slider 332 and the second guiding slider 334. The length of the comb attachment 300 may be decreased by pulling the comb blade section 310 in a proximal direction, for example, using the first guiding slider 332 and the second guiding slider 334. The one or more guiding sliders 332, 334 may have a sufficient stiffness so that they maintain their positions once they are set at a desired position (e.g., length, taper direction, and/or taper angle).

Figure 17:
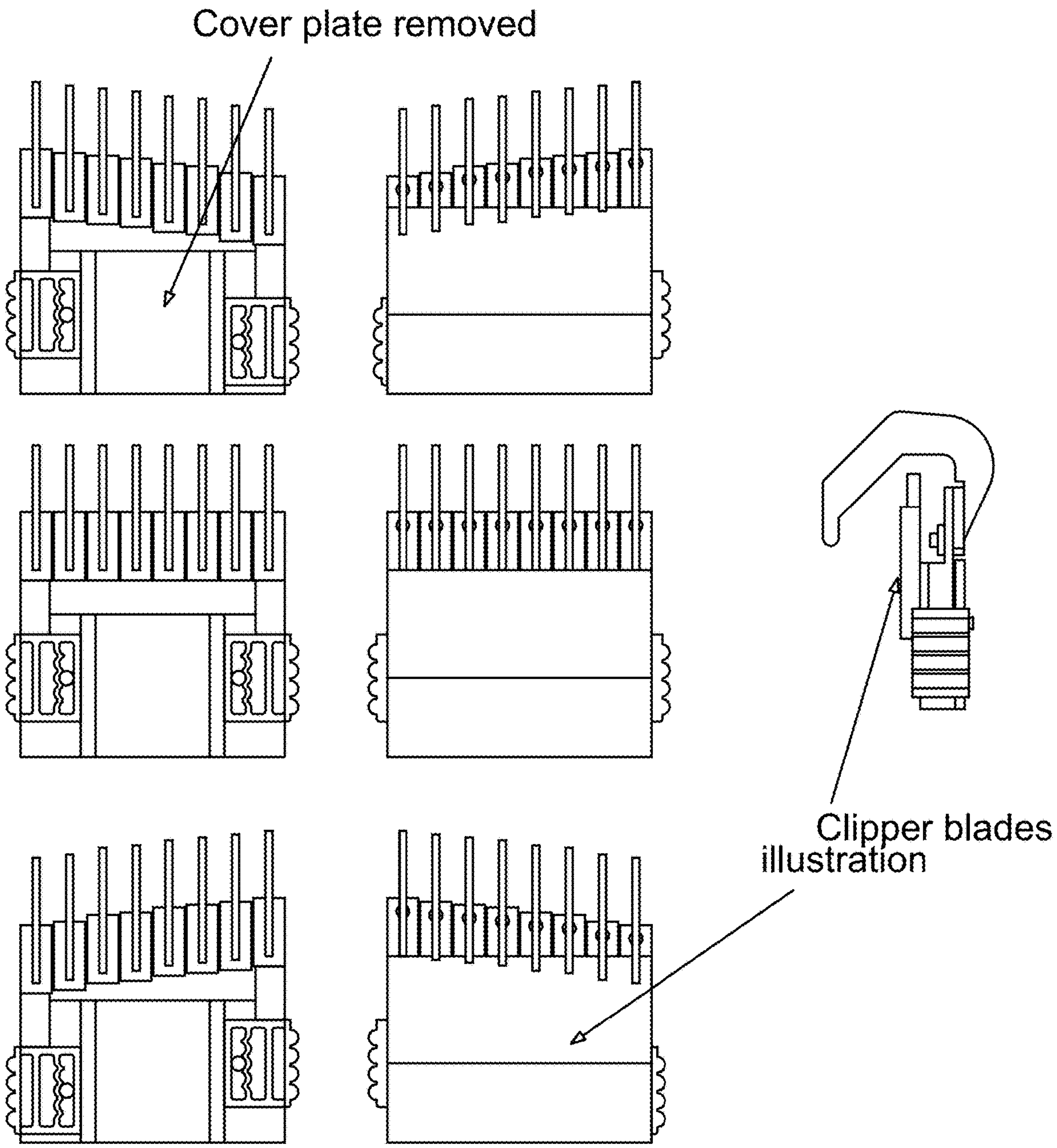
FIG. 17 illustrates how the example comb attachment of FIG. 11 changes taper angles by using the sliders.

As shown in FIGS. 15(*a*) and 15(*b*), the plurality of flexible protrusions 396 may be disposed on the first wall 398 and form a plurality of sections within the groove 397. Within one of these sections, the slider mechanism rod 372 can be secured. That is, in some examples, the guiding slider 332, 334 may be temporally fixed to a set location by the slider mechanism rod 372 secured by two adjacent flexible protrusions 396, the first wall 398 and the second wall 399. As shown in FIG. 17, as the guiding sliders 332, 334 are pushed/pulled, the slider mechanism rod 372 may be located at a different section of the groove 397. For example, if the guiding slider is pushed in the distal direction, the slider mechanism rod 372 may be moved toward a proximal section of the groove 397. If the guiding slider is pull in the proximal direction, the slider mechanism rod 372 may be moved toward a distal section of the groove 397.

In some examples, the base section 320 may further include a motion-control guiding plate 350. In some examples, the motion-control guiding plate 350 may convert the relative movement of the first and second guiding sliders 332, 334 into a rotation motion of the comb blade section 310. In some examples, the motion-control guiding plate 350 may be in a longitudinal plate shape. In other examples, the motion-control guiding plate 350 may be in any other suitable shape (e.g., trapezoid). In some examples, the fin sections 315 of the comb blade section 310 may be independent from each other and linked together through the motion-control guiding plate 350.

Figure 16:
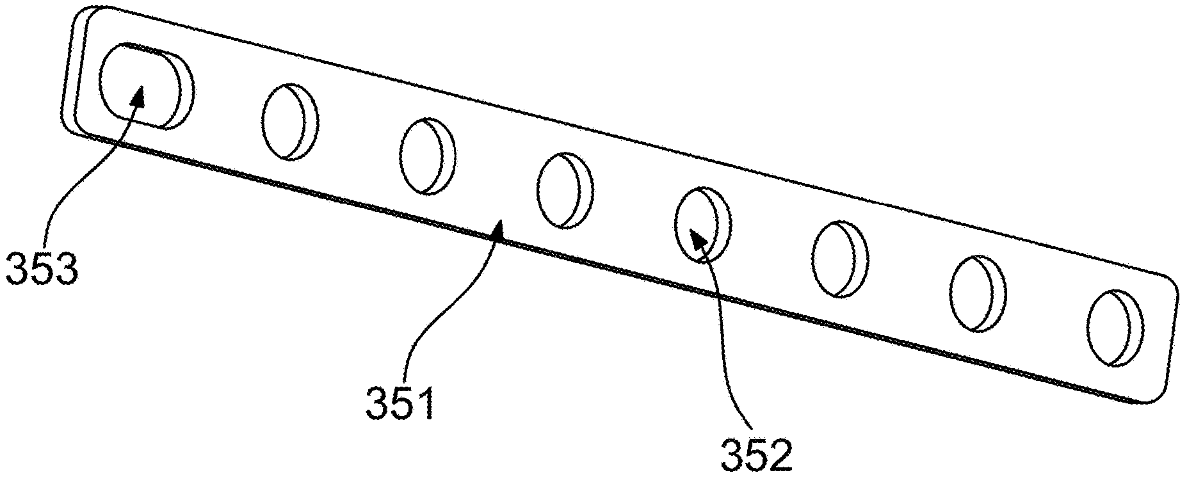
FIG. 16 is a perspective view of a schematic diagram of a guiding plate of the example comb attachment of FIG. 11.

Referring to FIG. 16, in some examples, the motion-control guiding plate 350 may include a guiding plate body 351 and a plurality of holes 352. Each of the plurality of holes 352 may correspond to a respective fin section 352. For example, each of the plurality of holes 352 may be configured to accept the slider guiding rod 312 or the guiding plate rod 316 of a respective fin section 315. In some examples, at least one of the holes 352 may be an elongated hole 353. The elongated hole 353 may be provided to facilitate the rotation of the guiding plate 350. In some example, the elongated hole 353 may be provided near an end portion (e.g., left end or right end) of the guiding plate 350. In some examples, a portion of the motion transfer guiding arm 391 may be disposed between the motion-control guiding plate 350 and the comb blade section 310 (e.g., lateral-motion restricting plate 313).

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B," "one or more of A and B," and "A and/or B" are each intended to mean "A alone, B alone, or A and B together." A similar interpretation is also intended for lists including three or more items. For example, the phrases "at least one of A, B, and C"; "one or more of A, B, and C"; and "A, B, and/or C" are each intended to mean "A alone, B alone, C alone, A and B together, A and C together, B and C together, or A and B and C together." Use of the term "based on" above and in the claims is intended to mean "based at least in part on," such that an unrecited feature or element is also permissible.

All ranges described are intended to include all numbers, whole or fractions, contained within the said range. As used herein, "about," "approximately," and "substantially" are understood to refer to numbers in a range of numerals, for example the range of −10% to +10% of the referenced number, preferably −5% to +5% of the referenced number, more preferably-1% to +1% of the referenced number, most preferably −0.1% to +0.1% of the referenced number. Moreover, these numerical ranges should be construed as providing support for a claim directed to any number or subset of numbers in that range. For example, a disclosure of from 1 to 10 should be construed as supporting a range of from 1 to 8, from 3 to 7, from 1 to 9, from 3.6 to 4.6, from 3.5 to 9.9, and so forth.

As used herein, the singular forms "a", "an," and "the" are intended to include the plural forms as well, unless otherwise indicated. It will be further understood that the terms "comprises" and/or "comprising," when used in this specification, specify the presence of stated features, integers, steps, operations, elements, and/or components, but they do not preclude the presence or addition of one or more other features, integers, steps, operations, elements, components, and/or groups thereof.

Reference throughout the specification to "various examples," "some examples," "one example," "an example," "another example," or the like, means that a particular feature, structure, or characteristic described in connection with the example is included in at least one example. Thus, appearances of the phrases "various examples," "some examples," "one example," "an example," "another example," or the like, in places throughout the specification are not necessarily all referring to the same example. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, or characteristics of one or more other embodiments/examples without limitation. Such modifications and variations are intended to be included within the scope of the present invention.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims. Moreover, consistent with current U.S. law, it should be appreciated that 35 U.S.C. 112(f) or pre-AIA 35 U.S.C. 112, paragraph 6 is not intended to be invoked unless the terms “means” or “step” are explicitly recited in the claims. Accordingly, the claims are not meant to be limited to the corresponding structure, material, or actions described in the specification or equivalents thereof.

The invention is claimed as follows:

1. A comb attachment for use with a hair clipper, the comb attachment comprising:
- a comb blade section; and
- a base section configured to be removably attached to a hair clipper, wherein the base section is configured to:
  - adjust a taper angle of the comb blade section; and
  - adjust a length of the comb attachment,
- wherein the comb blade section comprises a plurality of fins, wherein each fin comprises at least one of a slider guiding rod and a guiding plate rod,
- wherein the plurality of fins define a virtual line perpendicular to each of the plurality of fins,
- wherein each of the plurality of fins is configured to move back and forth as the taper angle is changed,
- wherein each of the plurality of fins is perpendicular to the virtual line all the time as the taper angle is changed,
- wherein the base section comprises a first guiding slider and a second guiding slider,
- wherein the first guiding slider comprises a first motion transfer arm and the second guiding slider comprises a second motion transfer arm,
- wherein the base section comprises a guiding plate, the guiding plate comprising:
  - a guiding plate body; and
  - a plurality of holes,
- wherein each of the plurality of fins is independently rotatably coupled to the guiding plate by each of the plurality of holes accepting the at least one slider guiding rod and guiding plate rod of each fin,
- wherein the first motion transfer arm and the second motion transfer arm are coupled to the guiding plate,
- wherein the comb blade section is configured to be rotated, by a relative movement of the first guiding slider and the second guiding slider, to adjust the taper angle.

2. The comb attachment of claim 1, wherein the length of the comb attachment is increased by pushing the comb blade section in a distal direction using the first guiding slider and the second guiding slider.

3. The comb attachment of claim 1, wherein the length of the comb attachment is decreased by pulling the comb blade section in a proximal direction using the first guiding slider and the second guiding slider.

4. The comb attachment of claim 1, wherein the motion-control guiding plate is configured to convert the relative movement of the first and second guiding sliders into the rotation of the comb blade section.

5. The comb attachment of claim 4, wherein the motion-control guiding plate is attached to the comb blade section through a fastener.

6. The comb attachment of claim 1, wherein a first portion of the first motion transfer arm and a second portion of the second motion transfer arm are disposed between the motion-control guiding plate and the comb blade section.

7. The comb attachment of claim 1, wherein the taper angle is in a range of about −30° to +30°.

8. A hair-clipping assembly comprising:
- a hair clipper; and
- a comb attachment for use with the hair clipper, wherein the comb attachment comprises:
  - a comb blade section; and
  - a base section configured to be removably attached to a hair clipper, wherein the base section is configured to:
    - adjust a taper angle of the comb blade section; and
    - adjust a length of the comb attachment,
- wherein the comb blade section comprises a plurality of fins, wherein each fin comprises at least one of a slider guiding rod and a guiding plate rod,
- wherein the plurality of fins define a virtual line perpendicular to each of the plurality of fins,
- wherein each of the plurality of fins is configured to move back and forth as the taper angle is changed,
- wherein each of the plurality of fins is perpendicular to the virtual line all the time as the taper angle is changed,
- wherein the base section comprises a first guiding slider and a second guiding slider,
- wherein the first guiding slider comprises a first motion transfer arm and the second guiding slider comprises a second motion transfer arm,
- wherein the base section comprises a guiding plate, the guiding plate comprising:
  - a guiding plate body; and
  - a plurality of holes,
- wherein each of the plurality of fins is independently rotatably coupled to the guiding plate by each of the plurality of holes accepting the at least one slider guiding rod and guiding plate rod of each fin,
- wherein the first motion transfer arm and the second motion transfer arm are coupled to the guiding plate,
- wherein the comb blade section is configured to be rotated, by a relative movement of the first guiding slider and the second guiding slider, to adjust the taper angle.

9. The hair-clipping assembly of claim 8, wherein the length of the comb attachment is increased by pushing the comb blade section in a distal direction using the first guiding slider and the second guiding slider, and wherein the length of the comb attachment is decreased by pulling the comb blade section in a proximal direction using the first guiding slider and the second guiding slider.

10. The hair-clipping assembly of claim 8, wherein a first portion of the first motion transfer arm and a second portion of the second motion transfer arm are disposed between the motion-control guiding plate and the comb blade section.

11. The hair-clipping assembly of claim 8, wherein the taper angle is in a range of about −30° to +30°.

* * * * *